Jan. 15, 1963 J. P. McHUGH ET AL 3,073,883

THERMOELECTRIC MATERIAL

Filed July 17, 1961 8 Sheets-Sheet 1

$Ag_2 Sb_{2.2} Te_{4.3}$ $(Sb_2 Te_3 : Ag_2 Te = 1.1 : 1)$

INVENTORS
James P. McHugh, Martin S. Lubell,
Robert G. R. Johnson & Jack T. Brown
BY
Frederick Shapoe
ATTORNEY Jan. 15, 1963 J. P. McHUGH ET AL 3,073,883

THERMOELECTRIC MATERIAL

Filed July 17, 1961 8 Sheets-Sheet 2

$Ag_2Sb_{2.6}Te_{4.9}$ $(Sb_2Te_3 : Ag_2Te = 1.3 : 1)$

Jan. 15, 1963 J. P. McHUGH ET AL 3,073,883

THERMOELECTRIC MATERIAL

Filed July 17, 1961 8 Sheets-Sheet 3

Ag $Sb_{1.4}Te_{2.6}$ ($Sb_2Te_3 : Ag_2Te = 1.4:1$)

Jan. 15, 1963 J. P. McHUGH ET AL 3,073,883

THERMOELECTRIC MATERIAL

Filed July 17, 1961 8 Sheets-Sheet 4

$Ag_4Sb_6Te_{11}$ $(Sb_2Te_3 : Ag_2Te = 1.5 : 1)$

Jan. 15, 1963 J. P. McHUGH ET AL 3,073,883

THERMOELECTRIC MATERIAL

Filed July 17, 1961 8 Sheets-Sheet 5

$AgSb_{1.6}Te_{2.9}$ $(Sb_2Te_3 : Ag_2Te = 1.6 : 1)$

Jan. 15, 1963

J. P. McHUGH ET AL 3,073,883

THERMOELECTRIC MATERIAL

Filed July 17, 1961

8 Sheets-Sheet 6

$Ag_2Sb_{3.4}Te_{6.1}$ $(Sb_2Te_3 : Ag_2Te = 1.7 : 1)$ $Ag_2Sb_4Te_7$ $(Sb_2Te_3 : Ag_2Te = 2.0 : 1)$

Jan. 15, 1963 J. P. McHUGH ET AL 3,073,883

THERMOELECTRIC MATERIAL

Filed July 17, 1961 8 Sheets-Sheet 8

United States Patent Office 3,073,883

Patented Jan. 15, 1963

3,073,883

THERMOELECTRIC MATERIAL

James P. McHugh, Wilkinsburg, Martin S. Lubell, Swissvale, Robert G. R. Johnson, Turtle Creek, and Jack T. Brown, Monroeville, Pa., assignors to Westinghouse Electric Corporation, East Pittsburgh, Pa., a corporation of Pennsylvania Filed July 17, 1961, Ser. No. 124,465
11 Claims. (Cl. 136—5)

Figure 1:
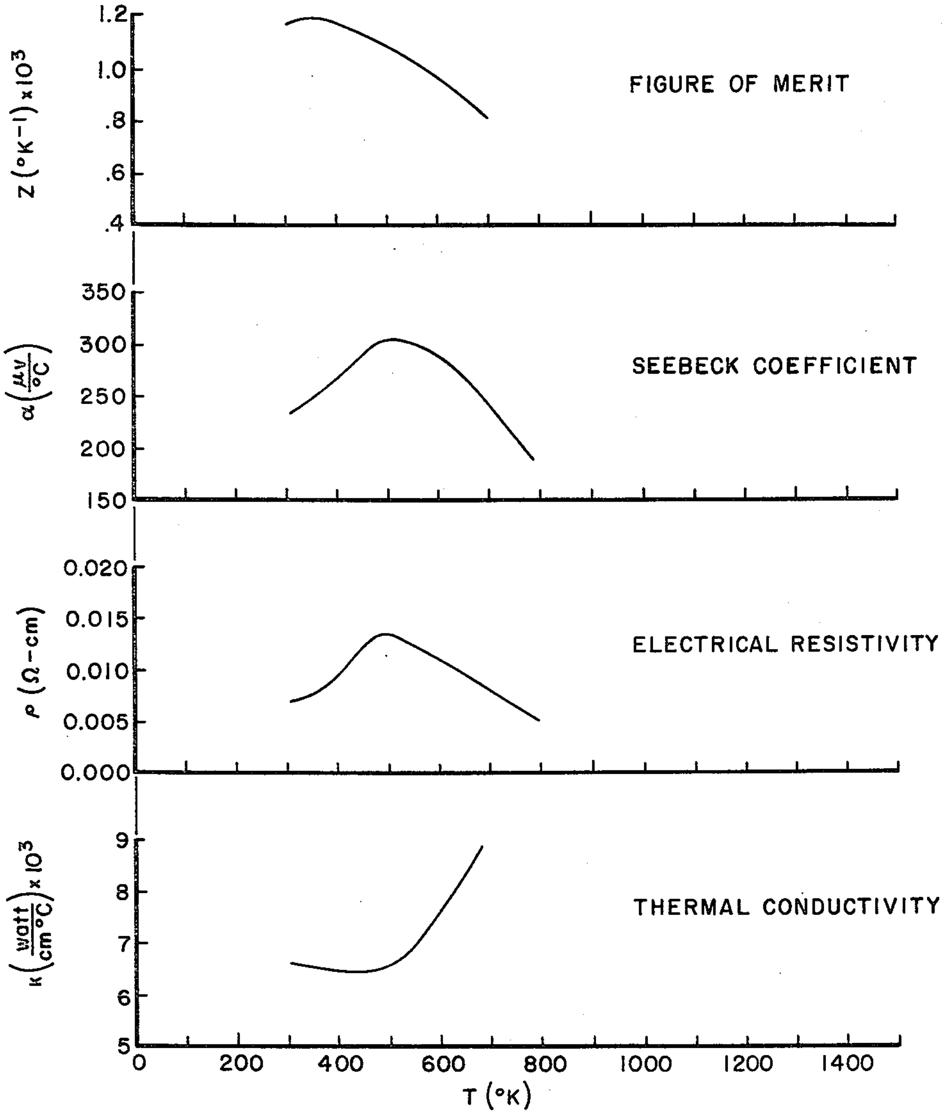

The present invention relates generally to a thermoelectric material and devices made therefrom, and particularly to thermoelectric devices operating in accordance with the Seebeck or Peltier effect comprised of at least one thermoelectric element consisting of an antimony telluride-silver telluride pseudo-binary alloy.

It has been regarded as being highly desirable to produce more efficient thermoelectric devices wherein either an electric current is passed therethrough to effect a greater amount of cooling at one junction or, alternatively, a source of heat is applied to one junction of a thermoelectric device to bring this junction to a given elevated temperature, while the other junction of the device is kept at a low temperature, whereby increased electrical energy is generated by the device.

When heat is applied to one junction of a thermoelectric device while the other junction is cooled, an electrical potential is produced proportional to the thermoelectric power of the thermoelectric elements employed and to the temperature difference between the junctions. Accordingly, it is desirable that the thermoelectric elements be made of such materials that, all other factors being equal, the highest potential is developed for a given temperature difference between the hot and cold junctions. The electrical resistivity, and the thermal conductivity of the thermoelectric element member of the device should be as low as possible in order to reduce electrical and thermal losses.

A thermoelectric member may be tested and a number indicating its relative effectiveness, called the figure of merit, may be computed from appropriate test data. The higher the figure of merit the more efficient is the thermoelectric material. The figure of merit, denoted as Z, is defined by:

$$Z=\frac{\alpha 2}{\rho K}$$

wherein:

$\alpha$=Seebeck coefficient in volts/° C.;
$\rho$=electrical resistivity in ohm-centimeters; and
$K$=thermoconductivity in watt/centimeters/° C.

Semiconductor properties of certain silver-antimony-telluride ($AgSbTe_2$) have been investigated in the past, and U.S. Patent 2,882,468, issued April 14, 1959, to Wernick teaches the use of such material in a rectifying type semiconductor device. F. D. Rosi, J. P. Dismukes, and E. F. Hockings, in an article entitled "Semiconductor Materials For Thermoelectric Power Generation up to 700° C.," Electrical Engineering, pages 450 to 459, June 1960, discuss the use of $AgSbTe_2$ as a thermoelectric material.

However, these earlier investigators indicated that the thermoelectric properties of $AgSbTe_2$ were not particularly high and could not be improved since they could not adjust the properties of the $AgSbTe_2$ by the use of the usual doping materials known to those skilled in the art.

The surprising discovery has now been made that when silver, antimony and tellurim are reacted in certain specified proportions a pseudo-binary alloy, of $Sb_2Te_3$—$Ag_2Te$, results and that the thermoelectric properties of the pseudo-binary alloy can be varied by varying the mole ratio between $Sb_2Te_3$ and $Ag_2Te$, so as to attain a figure of merit far higher than obtained previously or thought possible, thereby providing a useful thermoelectric material.

An object of the present invention is to provide a p-type thermoelectric material consisting of a pseudo-binary alloy comprising from 1.1 to 2.0 moles, and preferably from 1.3 to 1.7 moles, of $Sb_2Te_3$ per mole of $Ag_2Te$.

Another object of the present invention is to provide a p-type thermoelectric material consisting of a ternary alloy comprising, by weight, 13.84% to 20.55% silver, 30.32% to 26.16% antimony, and 55.84% to 53.29% tellurium, and, preferably, by weight, from 15.30% to 18.92% silver, 29.41% to 27.17% antimony, and 55.29% to 53.19% tellurium.

Another object of the present invention is to provide a thermoelectric device comprising a p-type thermoelectric element consisting of a pseudo-binary alloy comprising from 1.1 to 2.0 moles, and preferably from 1.3 to 1.7 moles, of $Sb_2Te_3$ per mole of $Ag_2Te$.

Still another object of the present invention is to provide a thermoelectric device comprising a p-type thermoelectric element comprised of a ternary alloy consisting of 13.84% to 20.55%, by weight, silver, 30.32% to 26.16%, by weight, antimony, and 55.84% to 53.29% by weight tellurium.

Other objects will, in part, appear hereinafter and will, in part, be obvious.

Figure 6:
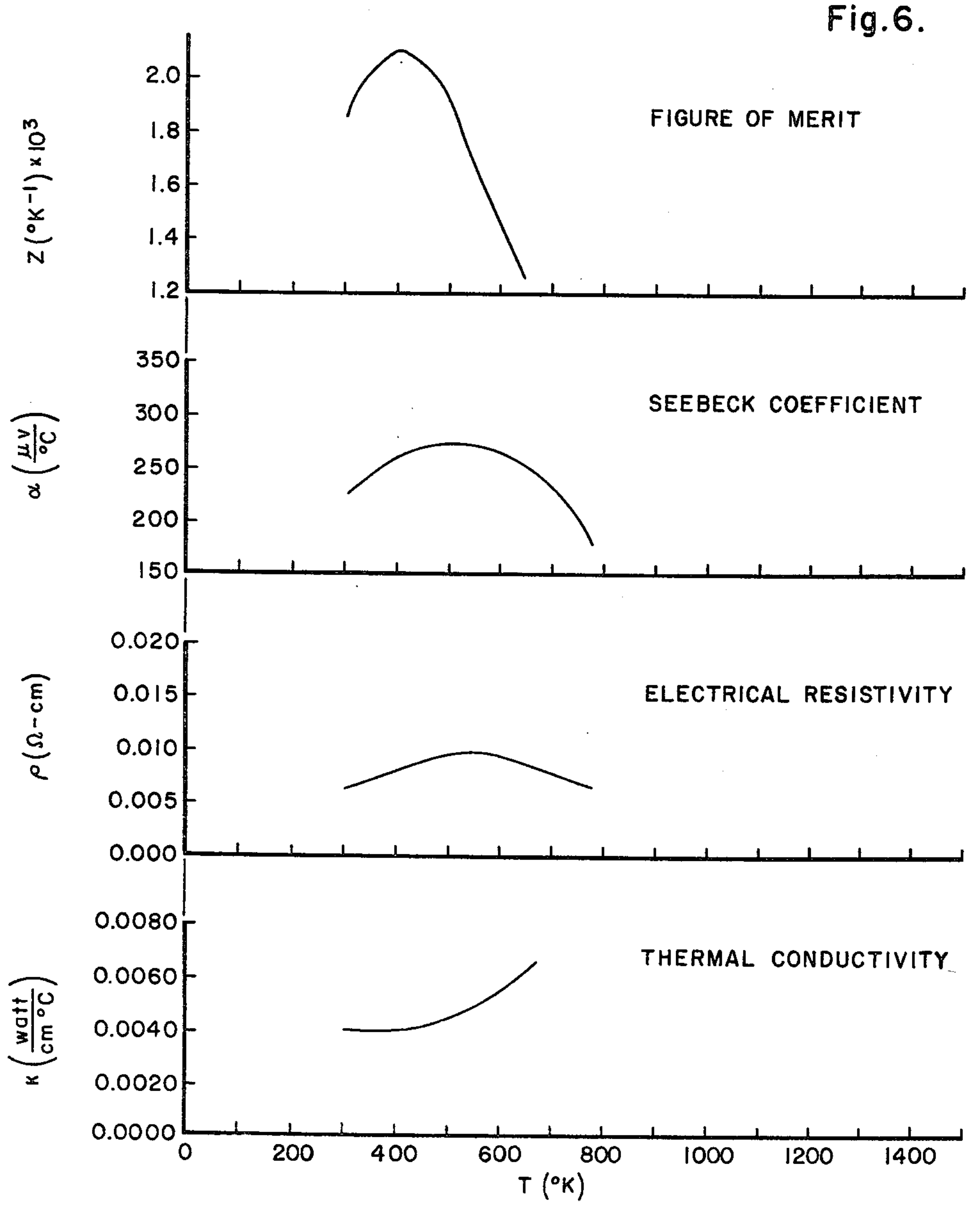
Figure 7:
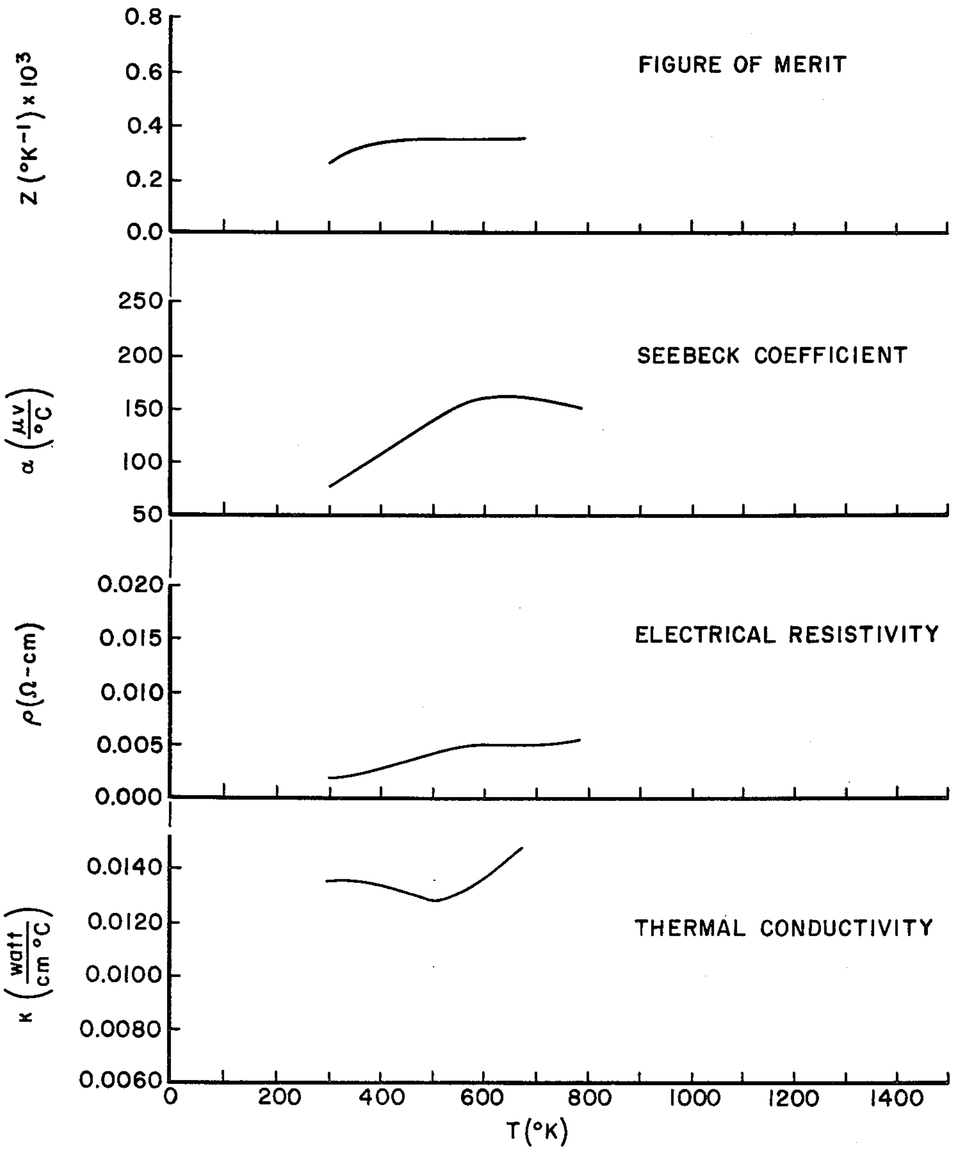
Figure 8:
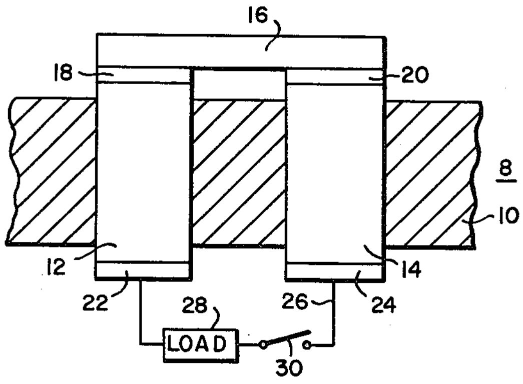
Figure 9:
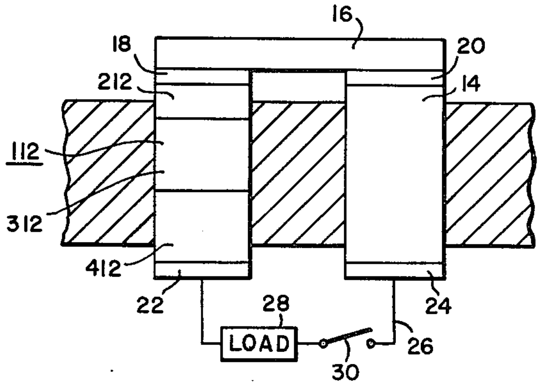

For a better understanding of the nature and the objects of this invention, reference should be had to the following description and drawings, in which:

FIGURES 1 to 7 inclusive are graphs showing the relationship between the figure of merit, the Seebeck coefficient, electrical resistivity, and thermal conductivity and temperature of the alloys of this invention; and FIGS. 8 and 9 are views partly in cross-section of a thermoelectric device employing the material of this invention.

In accordance with the present invention and attainment of the foregoing objects there is provided a p-type thermoelectric material consisting of a pseudo-binary alloy comprising from 1.1 to 2.0 moles of $Sb_2Te_3$ per mole of $Ag_2Te$. The desired pseudo-binary alloy contains from 13.84% to 20.55%, by weight, silver, 30.32% to 26.16%, by weight, antimony and 55.84% to 53.29%, by weight, tellurium. The thermoelectric material of this invention may be formed into a thermoelectric element and employed as a p-type element in a thermoelectric device operating in accordance with the Seebeck or Peltier effect.

A thermoelectric material of opposite sign (n-type) which may be used in combination with the material of this invention may be comprised of a metal, for example, copper, silver and mixtures of alloys thereof, and negative thermoelectric materials, for example, indium arsenide, aluminum arsenide, antimony telluride, and mixtures thereof. A thermoelectric element comprising the pseudo-binary alloy of this invention is most efficient at a temperature in the range of from approximately 150° C. to 450° C., the peak of the efficiency curve depending on its specific composition. Accordingly the negative thermoelectric element material must also function well and be chemically and thermally stable within this temperature range.

One suitable method of preparing the pseudo-binary alloy of this invention comprises admixing predetermined quantities of silver, antimony and tellurium to form a composition comprised of from 13.84% to 20.55%, by weight, silver, 30.32% to 26.16%, by weight, antimony and from 55.84% to 53.29%, by weight, tellurium. The admixture is charged into a vessel of quartz or other suitably inert material that will not react with a melt of the material. The vessel is evacuated and sealed off under a vacuum, for example a vacuum of for approximately $10^{-2}$ to $10^{-5}$, preferably about $10^{-4}$, mm. Hg. The vessel is placed in a horizontal tube furnace and heated to a temperature in excess of 550° C., preferably a temperature of approximately 700° C., at which temperature the entire admixture becomes molten. The vessel is agitated to ensure complete mixing during the melting period.

The vessel is then suspended in the upper half of a vertical, double chamber furnace in which the upper half or chamber of the furnace is maintained at a temperature ranging from 575° C. to 800° C., preferably about 700° C., and the lower half or other chamber of the furnace is maintained at a temperature ranging from 450° C. to 550 C., preferably about 500° C. Satisfactory results have been achieved using a furnace in which each chamber is twelve inches long and the vessel is initially suspended so that the vessel is centered midway in the top chamber and the contents melted. The vessel is then lowered into the bottom chamber of the furnace at a rate of, for example 0.75 inch per hour. However, rates of from 0.25 inch per hour to 1.50 inches or more per hour may be employed. During the lowering into the bottom chamber of the furnace, the melt solidifies at a controlled rate. The solidified alloy is held at a temperature of approximately 500° C. for about 24 hours and then allowed to cool slowly, for example over a period of two hours or so, to room temperature. The alloy formation can also be carried out in a one chamber furnace, the initial temperature being sufficient to melt the materials and the temperature within the chamber then being slowly reduced, after the melting is complete, to cause solidification.

Another suitable method for preparing the allow of this invention comprises melting the silver, antimony and tellurium in the indicated proportions in an inert vessel as before at a temperature of about 600° C. to 800° C., preferably about 750° C., and then lowering the vessel and melt at a rate of about 0.4 inch per hour to 1.0 inch per hour, preferably 0.6 inch per hour into a tank containing water or some other suitable cooling fluid such as brine, oil and the like at or about room temperature, whereby, the melt is solidified.

The molten alloy may also be solidified by air or gas quenching or cooling. In some cases, the solidified body of alloy has been annealed at for example a temperature of about 525° C. to about 550° C. for periods of from six to ten hours.

The alloy thus prepared is comprised of from 13.84% to 20.55%, by weight, silver, 30.32% to 26.16% by weight, antimony and 55.84% to 53.29% by weight, tellurium. The alloy behaves however as a two phase, or pseudo-binary alloy, and not a congruently melting three component alloy or chemical compound. The two components in this pseudo-binary alloy are $Sb_2Te_3$ and $Ag_2Te$ in a ratio of from 1.1 moles to 2.0 moles of $Sb_2Te_3$ per mole of $Ag_2Te$, and preferably from 1.3 to 1.7 moles of $Sb_2Te_3$ per mole of $Ag_2Te$.

The table below lists a series of alloys of this invention which were prepared, each being expressed as a three component silver-antimony-tellurium alloy, a pseudo-binary alloy and by chemical formula.

TABLE

*Alloy Composition*

| Chemical Formula | Weight Percent | | | Mole Ratio, $Sb_2Te_3$:$Ag_2Te$ |
|---|---|---|---|---|
| | Ag | Sb | Te | |
| $Ag_2Sb_4Te_7$ | 13.84 | 30.32 | 55.84 | 2.0:1 |
| $Ag_2Sb_{3.4}Te_{6.1}$ | 15.30 | 29.41 | 55.29 | 1.7:1 |
| $AgSB_{1.6}Te_{2.9}$ | 16.05 | 28.95 | 55.00 | 1.6:1 |
| $Ag_4Sb_6Te_{11}$ | 16.82 | 28.47 | 54.71 | 1.5:1 |
| $AgSb_{1.4}Te_{2.6}$ | 17.86 | 27.83 | 54.31 | 1.4:1 |
| $Ag_2Sb_{2.6}Te_{4.9}$ | 18.92 | 27.17 | 53.91 | 1.3:1 |
| $Ag_2Sb_{2.2}Te_{4.3}$ | 20.55 | 26.16 | 53.29 | 1.1:1 |

Alloys prepared in accordance with the teachings of this invention function particularly well as p-type thermoelectric materials in the temperature range of from about 150° C. to 450° C. the peak of the efficiency curve being in this range and depending on the particular composition of the alloy.

The following examples are illustrative of the teachings of this invention:

EXAMPLE I

A homogeneous mixture comprising 20.55 grams of silver, 26.16 grams of antimony and 53.29 grams of tellurium, all in finely powdered form and 99.99% pure, were charged into a 15 millimeter diameter quartz tube. The tube was evacuated and sealed off under a vacuum of $10^{-4}$ millimeters Hg. The tube was then placed in a furnace and heated to a temperature of 700° C. at which temperature the admixture became molten. The tube was agitated to ensure thorough mixing of the silver, antimony and tellurium during melting. The tube was then suspended at approximately the mid-point of the upper chamber of a vertical double chamber furnace. The upper chamber was at a temperature of 700° C. and the lower chamber of the furnace was at a temperature of 500° C. The upper and lower chambers or the double chamber vertical furnace were each twelve inches long.

The tube containing the molten alloy was lowered from the upper chamber to the bottom chamber at a rate of 0.75 inch per hour during which time the molten alloy solidified. The solidified alloy was maintained at a temperature of 500° C. within the furnace for 24 hours, and then allowed to cool to room temperature over a period of approximately two hours.

The resulting alloy had the formula $Ag_2Sb_{2.2}Te_{4.3}$. It was comprised of 20.55%, by weight, silver, 26.16% by weight, antimony and 53.29%, by weight, tellurium and contained 53.0 mole percent $Sb_2Te_3$ and 47 mole percent $Ag_2Te$. The mole ratio of $Sb_2Te_3$ to $Ag_2Te$ was 1.1 to 1.

The body of alloy was cut into test wafers and the Seebeck coefficient ($\alpha$) in volts/° C. and the electrical resistivity ($\rho$) in ohm-centimeters were determined over a temperature range of 300° K. to 800° K. The thermal conductivity (K) in watts/centimeter/°C. was determined for the temperature range 300° K. to 675 K.

The figure of merit (Z) was calculated using the equation:

$$Z=\frac{\alpha 2}{\rho K}$$

wherein ($\alpha$), ($\rho$) and (K) have the meanings set forth hereinabove.

The values of ($\alpha$), ($\rho$), (K) and (Z) over the temperature range of 300° K. to 800° K. are set forth graphically in FIGURE 1. From FIGURE 1 is can realily be seen that the alloy of this example has a peak figure of merit Z of about $1.2\times10^{-3}$/°C. at about 350° K. These values are well above those obtained for the prior art compound $AgSbTe_2$.

EXAMPLE II

A homogeneous mixture comprising 18.92 grams silver, 27.17 grams antimony and 53.91 grams of tellurium, all in finely powdered form 99.99% pure, were charged into a fifteen millimeter diameter quartz tube. The tube was evacuated and sealed off under a vacuum of $10^{-4}$ mm. Hg. The tube was then placed in a furnace and heated to a temperature of 700° C. at which temperature the admixture became molten. The tube was agitated to ensure thorough mixing of the silver, antimony and tellurium.

The tube was then suspended at approximately the midpoint of the upper chamber of a vertical double chamber furnace. The upper chamber was at a temperature of 700° C. After thorough homogeneization of the melt, the temperature of the upper chamber of the furnace was slowly decreased to 500° C. during which time the melt solidified.

The resultant alloy has the formula $Ag_2Sb_{2.6}Te_{4.9}$. It is comprised of 18.92% by weight silver, 27.17% by weight antimony and 53.91% by weight tellurium and contains 56 mole percent $Sb_2Te_3$ and 44 mole percent $Ag_2Te$. The mole ratio of $Sb_2Te_3$ to $Ag_2Te$ was 1.3 to 1.

The solidified melt was annealed at 500° C. for eight hours and then cut into test wafers. The Seebeck coefficient ($\alpha$) in volts/°C., and the electrical resistivity ($\rho$) in ohm-centimeters were determined over a temperature range of 300° K. to 800° K. The thermal conductivity (K) was determined over the range 300° K. to 675° K.

The figure of merit (Z) was calculated using the equation:

$$Z=\frac{\alpha 2}{\rho K}$$

Figure 2:
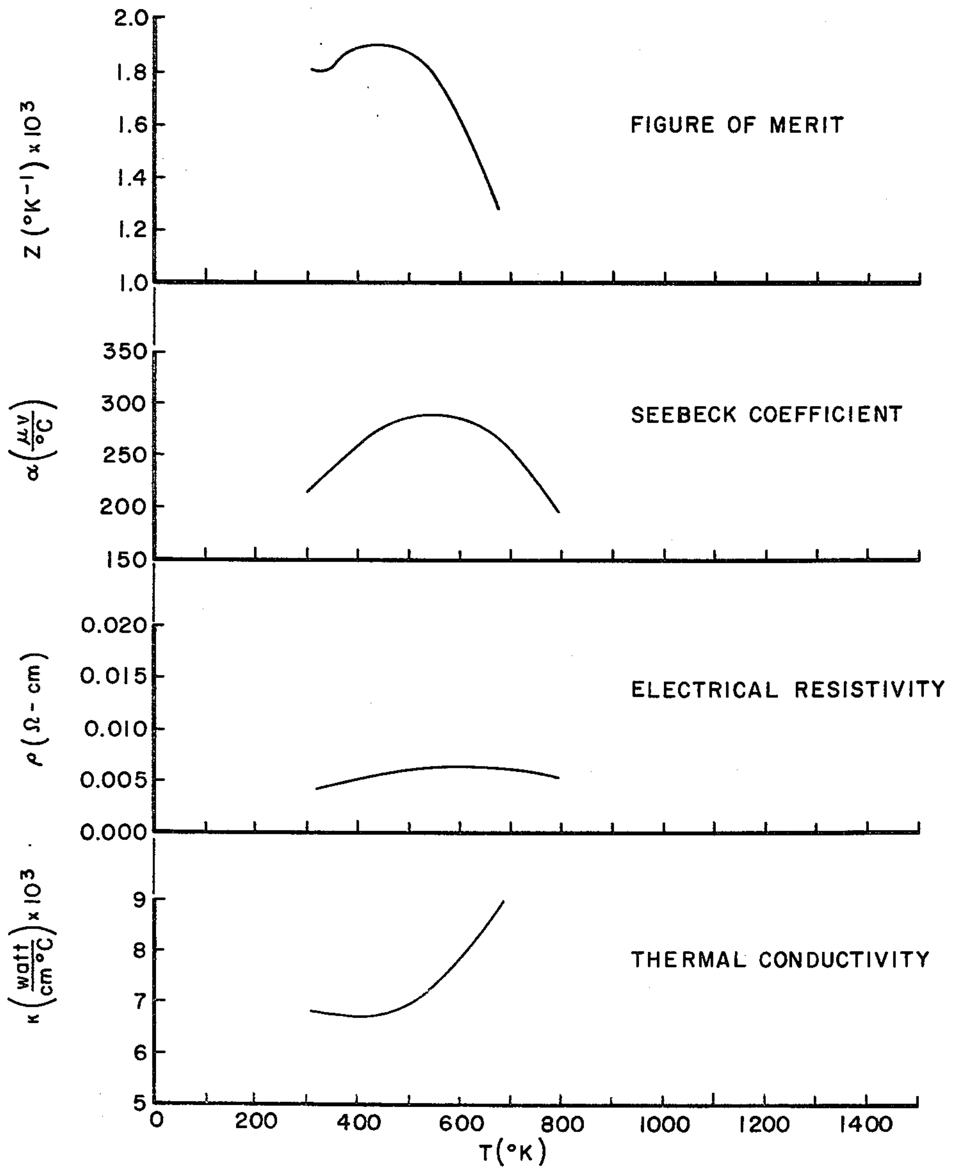

The values of ($\alpha$), ($\rho$), (K) and (Z) over the temperature range of 300° C. to 800° C. are set forth graphically in FIGURE 2. From FIGURE 2 it can readily be seen that the alloy of this example has a peak figure of merit of about $1.85\times10^{-3}$ in the temperature range of 400° C. to 500° C.

EXAMPLE III

The procedure of Example I was repeated employing 17.86 grams of silver, 27.83 grams of antimony and 54.31 grams of tellurium.

The alloy of this example had the formula $AgSb_{1.4}Te_{2.6}$. It was comprised of 17.86%, by weight, silver, 27.83%, by weight, antimony and 54.31%, by weight, tellurium and contained 58 mole percent $Sb_2Te_3$ at 42 mole percent $Ag_2Te$. The mole ratio of $Sb_2Te_3$ to $Ag_2Te$ was 1.4 to 1.

The resultant body of alloy was cut into test wafers and the Seebeck coefficient, the electrical resistivity were determined over a temperature range of 300° K. to approximately 800° K. The thermal conductivity was calculated for the temperature range 300° K. to 675° K.

The figure of merit Z was calculated using the equation:

$$Z=\frac{\alpha 2}{\rho K}$$

wherein ($\alpha$), ($\rho$) and (K) have the meanings set forth hereinabove.

Figure 3:
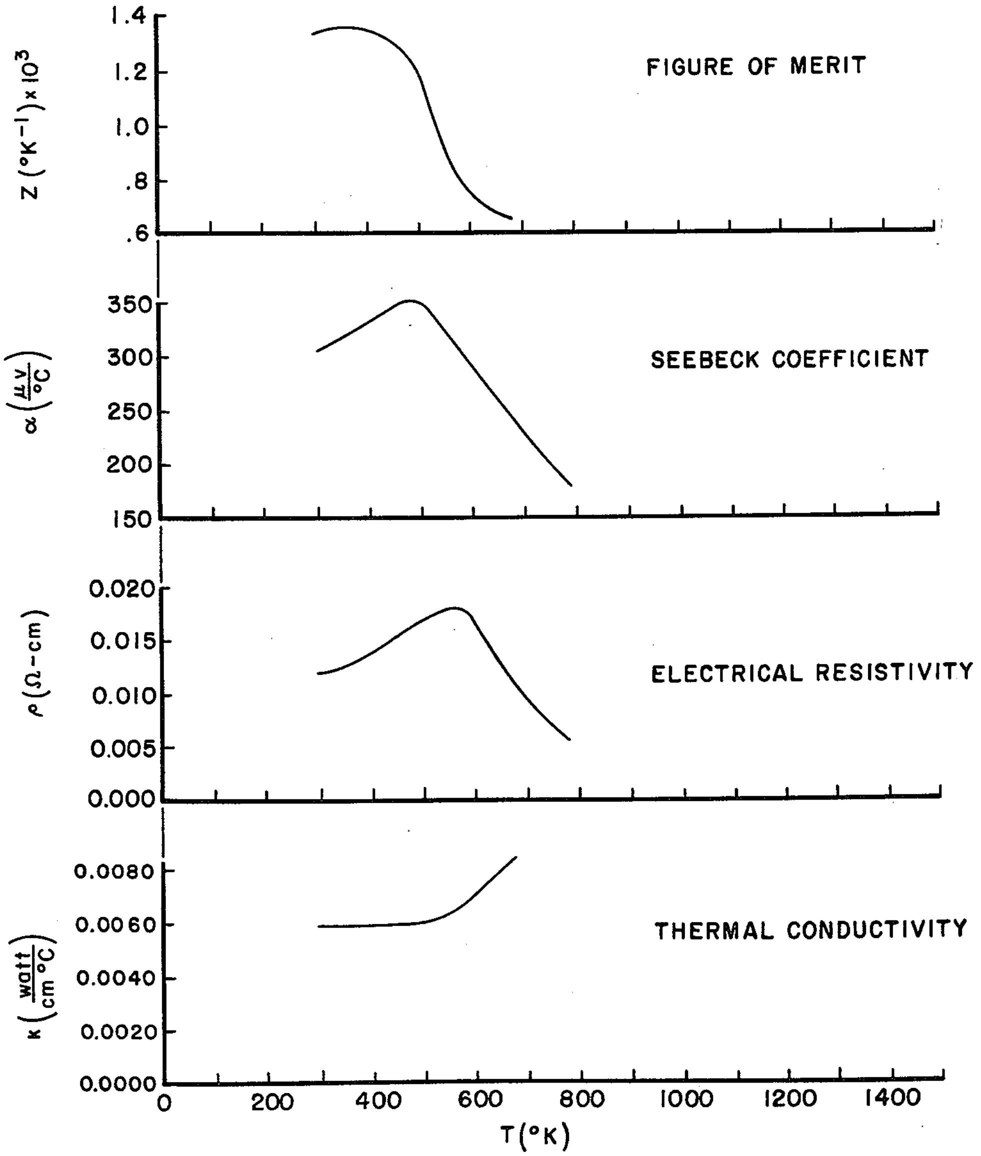

The values of ($\alpha$), ($\rho$), (K) and (Z) over the temperature range of 300° K. to 800° K. are set forth graphically in FIGURE 3. From FIGURE 3, it can be seen that the alloy of this example has a peak figure of merit of about $1.35\times10^{-3}$ at about 400° K.

EXAMPLE IV

The procedure of Example I was repeated employing 16.82 grams silver, 28.47 grams antimony and 54.71 grams of tellurium.

The resultant alloy had the formula $Ag_4Sb_6Te_{11}$ and was comprised of 16.82%, by weight, silver, 28.47%, by weight, antimony and 54.71%, by weight, tellurium. The alloy contained 60 mole percent $Sb_2Te_3$ and 40 mole percent $Ag_2Te$. The mole ratio of $Sb_2Te_3$ to $Ag_2Te$ was 1.5 to 1.

Figure 4:
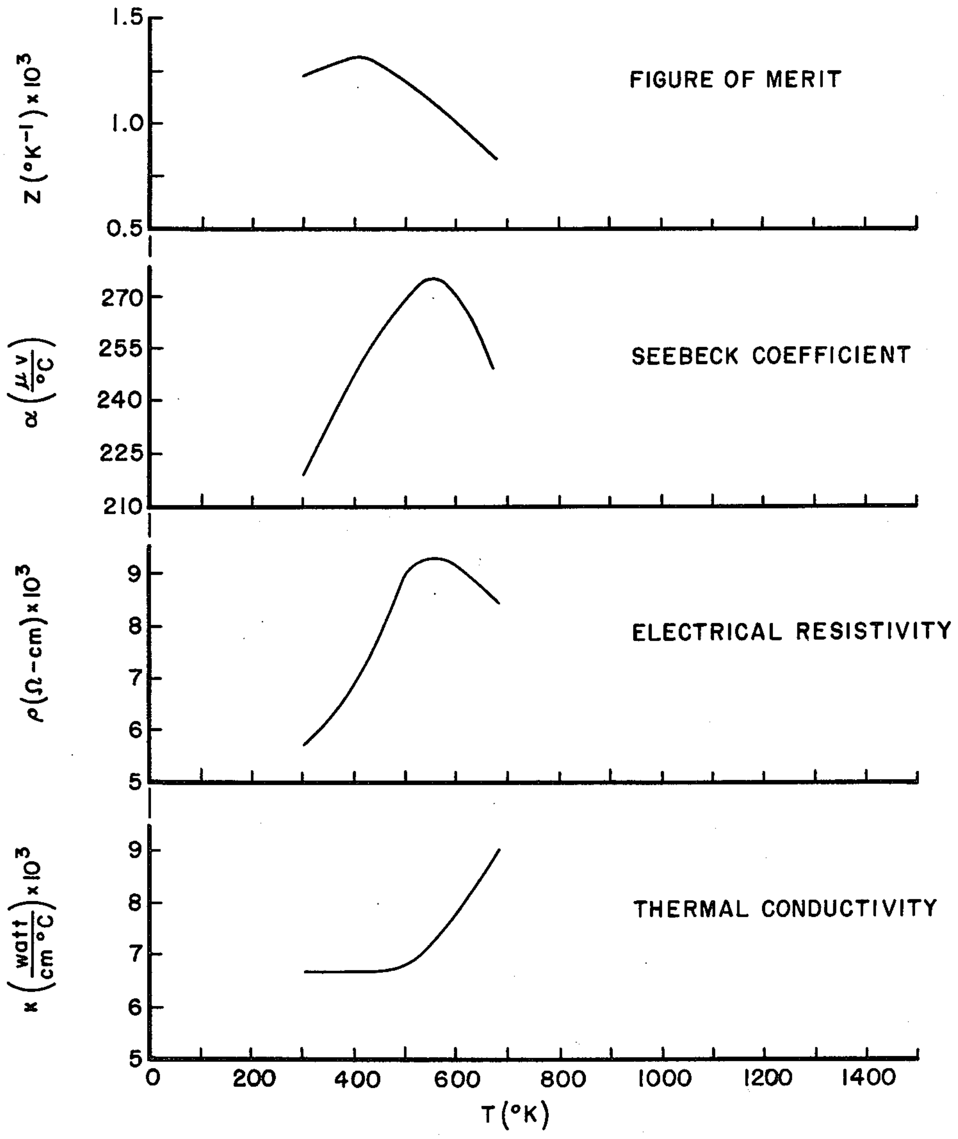

The Seebeck coefficient, electrical resistivity, thermal conductivity, and figure of merit of this alloy is set forth graphically in FIGURE 4. From FIGURE 4 it can be seen that the alloy of this example has a peak figure of merit of approximately $1.35\times10^{-3}$ at about 400° K.

EXAMPLE V

The procedure of Example I was substantially repeated employing 16.05 grams silver, 28.95 grams antimony and 55.00 grams tellurium. The resultant alloy had the formula $AgSb_{1.6}Te_{2.9}$, and was comprised of 16.05%, by weight, silver, 28.95%, by weight, of antimony and 55.00%, by weight, tellurium. The alloy was comprised of 61.5 mole percent $Sb_2Te_3$ and 38.5 mole percent $Ag_2Te$. The mole ratio of $Sb_2Te_3$ to $Ag_2Te$ was 1.6 to 1.

Figure 5:
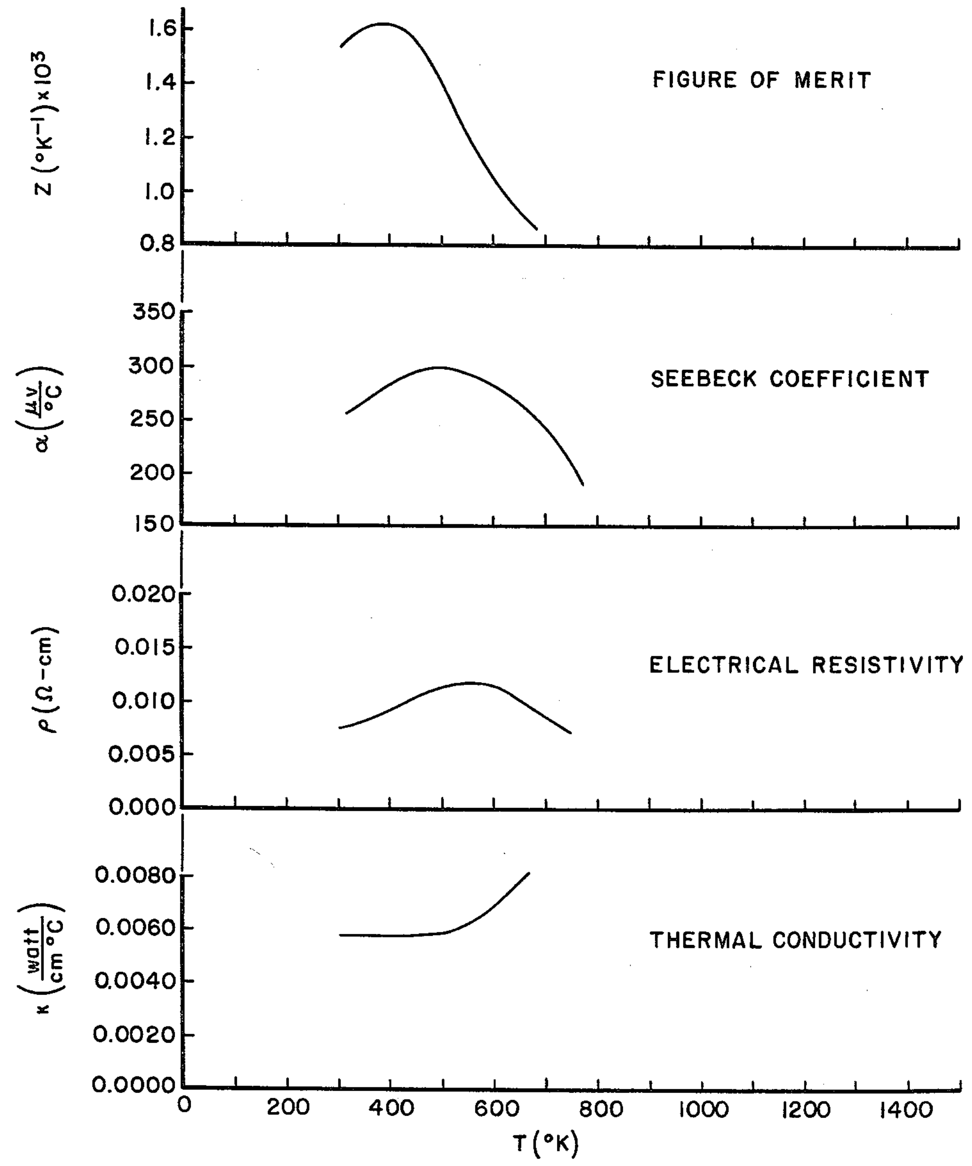

The Seebeck coefficient, electrical resistivity, thermal conductivity and figure of merit for this alloy over a temperature range of approximately 300° K. to 800° K. are set forth in FIGURE 5. From FIGURE 5 it is readily apparent that the alloy has a peak figure of merit in excess of $1.6\times10^{-3}$ 400° K.

EXAMPLE VI

The procedure of Example I was substantially followed employing 15.30 grams of silver, 29.41 grams of antimony and 55.29 grams of tellurium to prepare an alloy having the formula $Ag_2Sb_{3.4}Te_{6.1}$. The alloy was comprised of 15.30%, by weight, silver, 29.41%, by weight, antimony and 55.29%, by weight, tellurium and contained 63 mole percent $Sb_2Te_3$ and 37 mole percent $Ag_2Te$, and the mole ratio of $Sb_2Te_3$ to $Ag_2Te$ was 1.7 to 1.

In FIGURE 6 the figure of merit, Seebeck coefficient, electrical resistivity and thermal conductivity of the alloy are set forth graphically. From FIGURE 6 it can readily be seen that this alloy reaches a peak figure of merit value of approximately 2.1 at about 400° K. This is extremely high and far above that of prior art $AgSbTe_2$ materials. High figure of merit values will be obtained for mole ratios above and below the 1.7 to 1 ratio of this example—even up to 1.9 to 1.

EXAMPLE VII

A homogeneous mixture containing 13.84 grams of silver, 30.32 grams of antimony and 55.84 grams of tellurium, all in finely powdered form 99.99% pure, were charged into a 15 millimeter diameter quartz tube. The tube was evacuated sealed off under a pressure of approximately $10^{-4}$ millimeters Hg. The tube was then placed in a furnace and heated to a temperature of approximately 750° C. at which temperature the admixture became molten. The tube was agitated to ensure thorough mixing of the silver, antimony and tellurium. The tube was then suspended at approximately the mid-point of a twelve inch upper chamber of a vertical furnace. The chamber was at a temperature of approximately 750° C.

The tube containing the molten alloy was then lowered into a tank containing water at room temperature at a rate of 0.6 inch per hour during which time the sample froze. The resultant alloy contained 13.84%, by weight, silver, 30.32%, by weight, antimony and 55.84%, by weight, tellurium. The alloy had a formula $Ag_2Sb_4Te_7$, and was comprised of 66 mole percent $Sb_2Te_3$ and 34 mole percent $Ag_2Te$. The mole ratio of $Sb_2Te_3$ to $Ag_2Te$ was 2.0 to 1.

The body of solidified alloy was cut into test wafers and the Seeback coefficient, the electrical resistivity and the thermal conductivity were determined over a temperature range of approximately 300° K. to 800° K.

The figure of merit Z was calculated from this data using the equation:

$$Z=\frac{\alpha 2}{\rho K}$$

The Seeback coefficient, electrical resistivity, thermal conductivity and figure of merit are set forth graphically in FIGURE 7. It can be seen from FIGURE 7 that this alloy having the formula $Ag_2Sb_4Te_7$ has a peak figure of merit value of approximately .4 times $10^{-3}$ over the temperature range of approximately 400° K. to 700° K. While this figure of merit value is greatly reduced compared to the previous examples, there may be instances where it may be used. However, compositions where the $Sb_2Te_3\cdot Ag_2Te$ ratio is from 1.1:1 to 1.9:1 will be ordinarily preferred.

The various alloys prepared in accordance with the teachings of this invention and the above examples are suitable for use as p-type thermoelectric elements in thermoelectric generators and cooling devices.

Referring to FIGURE 9 of the drawing there is illustrated a thermoelectric device 8 suitable for producing an electrical current from heat. A thermally insulating wall 10 so formed as to provide a suitable furnace chamber is perforated to permit the passage therethrough of a positive thermoelectric element 12, prepared in accordance with the teaching of this invention and being comprised of an alloy of this invention, and a negative thermoelectric element 14 such as indium arsenide. An electrically conducting strip of metal 16 such as copper, silver or the like is joined to an end face 18 of the member 12 and end face 20 of the member 14 within the chamber so as to provide good electrical and thermal contact therewith. The end faces 18 and 20 may be coated with a thin layer of metal, for example, by vacuum evaporation or by use of ultrasonic brazing whereby good electrical contact is obtained. The metal strip 16 of copper, silver or the like may be brazed or soldered to the metal coated faces 18 and 20. The metal strip 16 may be provided with suitable fins or other means for conducting heat thereto from the furnace chamber in which it is disposed. At the end of member 12 located on the other side of the wall 10 is attached a metal plate or strip 22 by brazing or soldering the same manner as was employed in attaching strip 16 to the end face 18. Similarly, a metal strip or plate 24 may be connected to the other end of member 14. The plates 22 and 24 may be provided with heat dissipating fins or other cooling means whereby heat conducted thereto may be dissipated. The surface of the plates 22 and 24 may also be cooled by passing a current of a fluid such as water or air across their surfaces. An electrical conductor 26 and a load 28 are electrically connected to end plates 22 and 24. A switch 30 is interposed in the conductor 26 to enable the electrical current to be opened and closed as desired. When the switch 30 is moved to the closed position and electrical current flows between members 12 and 14 and energizes the load 28.

It will be appreciated that a plurality of pairs of the positive and negative members may be joined in series in order to produce a plurality of cooperating thermoelectric elements. In a similar manner, each of the thermoelectric elements may be disposed with one junction in a furnace or exposed to another source of heat while the other junction is cooled by applying water or flowing air thereon or the like. Due to the relative difference in the temperature of the junctions, an electrical voltage will be generated in the thermoelectric element. By joining in series a plurality of the thermoelectric elements, direct current of any suitable voltage may be generated.

With reference to FIGURE 9, while in FIGURE 8 the element 12 has been shown to be comprised entirely of one alloy, it will be understood that the thermoelectric element 112 may be comprised of a series of p-type thermoelectric materials, of which a section 212 comprises the alloy of this invention and sections 312 and 412 are comprised of other suitable and compatible thermoelectric materials. It should also be understood that sections 212, 312 and 412 of the element 112 may be comprised of an alloy of this invention in which the mole ratio of $Sb_2Te_3$ to $Ag_2Te$ has been varied in accordance with the teachings of this invention. By correlating the various sections of the element 112, the length of such elements and the composition of the sections there results an element comprised of material which will function at a peak figure of merit over the various temperature differentials existing along the length of the element.

It will be appreciated that the above description and drawing are only exemplary and not exhaustive of the teachings of this invention.

We claim as our invention:

1. A p-type thermoelectric material consisting of a pseudo-binary alloy comprising from 1.1 to 2.0 moles of $Sb_2Te_3$ per mole of $Ag_2Te$.

2. A p-type thermoelectric material consisting of a pseudo-binary alloy comprising from 1.3 to 1.7 moles of $Sb_2Te_3$ per mole of $Ag_2Te$.

3. A p-type thermoelectric material consisting of a ternary alloy composition consisting of 13.84 to 20.55%, by weight, silver, 30.32 to 26.16%, by weight, antimony and 55.84 to 53.29%, by weight, tellurium.

4. A p-type thermoelectric material consisting of a ternary alloy composition consisting of 15.30 to 18.92%, by weight, silver, 29.41 to 27.17%, by weight, antimony and 55.29 to 53.91%, by weight, tellurium.

5. A thermoelectric device comprising a p-type member comprised of a pseudo-binary alloy comprising from 1.1 to 2.0 moles of $Sb_2Te_3$ per mole of $Ag_2Te$, and an n-type member electrically connected to one portion of said p-type member.

6. A thermoelectric device comprising a p-type member comprised of a pseudo-binary alloy comprising from 1.3 to 1.7 moles of $Sb_2Te_3$ per mole of $Ag_2Te$, and an n-type member electrically connected to one portion of said p-type member.

7. A thermoelectric device comprising a p-type member comprised of a ternary alloy composition consisting of 13.84% to 20.55%, by weight, silver, 30.32 to 26.16%, by weight, antimony and 55.84 to 53.29%, by weight, tellurium, and an n-type member electrically connected to one portion of said p-type member.

8. A p-type thermoelectric element at least a portion of which is comprised of a ternary alloy composition consisting of 13.84 to 20.55%, by weight, silver, 30.32 to 26.16%, by weight, antimony and 55.84% to 53.29%, by weight, tellurium.

9. A thermoelectric device capable of generating power comprising a first member comprised of a pseudo-binary alloy comprising from 1.1 to 2.0 moles of $Sb_2Te_3$ per mole of $Ag_2Te$, a second member of a negative thermoelectric material, an electrically conductive member disposed between and metallurgically joined to a first surface of said first member and a first surface of said second member, a heat source transmitting heat to the first surface of said first and said second members, and electrical conductor joining a second surface of said first member and a second surface of said second member, and means for cooling said second surface of said first and second members, whereby an electrical current is generated.

10. A thermoelectric device capable of generating power comprising a first member comprised of a ternary alloy composition consisting of 13.84 to 20.55%, by weight, silver, 30.32 to 26.16%, by weight, antimony, and 55.84 to 53.29%, by weight, tellurium, a second member of a negative thermoelectric material, an electrically conductive member disposed between and metallurgically joined to a first surface of said first member and a first surface of said second member, a heat source transmitting heat to the first surface to said first and said second members, an electrical conductor joining a second surface of said first member and a second surface of said second member, and means for cooling said second surface of said first and second members, whereby an electrical current is generated.

11. A thermoelectric device capable of generating power comprising a first member, at least a portion of said first member being comprised of a p-type thermoelectric material consisting of a pseudo-binary alloy comprising from 1.1 to 2.0 moles of $Sb_2Te_3$ per mole of $Ag_2Te$, a second n-type member of a negative thermoelectric material, and electrically conductive member disposed between and metallurgically joined to a first surface of said first member and a first surface of said second member, a heat source transmitting heat to the first surface of said first and said second member, an electrical conductor joining a second surface of said first member and a second surface of said second member and means for cooling said second surface of said first and second members, whereby an electrical current is generated.

References Cited in the file of this patent

UNITED STATES PATENTS 2,882,468 Wernick ---------------- Apr. 14, 1959

2,995,613 Wernick ---------------- Aug. 8, 1961

OTHER REFERENCES

Rosi et al., "Semiconductor Materials for Thermoelectric Power Generation up to 700° C.," Electrical Engineering, pages 450–459, June 1960.